United States Patent
Trebes et al.

[15] 3,704,848
[45] Dec. 5, 1972

[54] MOUNTING AND LEVELING PAD

[72] Inventors: Eric W. Trebes, 8601 Balboa Blvd., Northridge, Calif. 91324; Fred W. Trebes, 4175 Ivanhoe Dr. 0703, Monroeville, Pa. 15146

[22] Filed: July 10, 1970

[21] Appl. No.: 53,917

[52] U.S. Cl. ............... 248/163, 248/188.4, 248/187, 248/188, 248/346
[51] Int. Cl. ......................................... F16m 11/04
[58] Field of Search ............ 248/163, 187, 188.4, 346

[56] References Cited

UNITED STATES PATENTS

| | | | |
|---|---|---|---|
| 911,544 | 2/1909 | Roehlk | 248/187 |
| 191,630 | 6/1877 | Wuterich | 248/188.4 |
| 824,525 | 6/1906 | Bonney | 248/188.4 |
| 972,287 | 10/1910 | Swift | 248/188.4 |

FOREIGN PATENTS OR APPLICATIONS

| | | | |
|---|---|---|---|
| 1,299,053 | 6/1962 | France | 248/346 |

*Primary Examiner*—William H. Schultz
*Attorney*—Lowell G. Turner

[57] ABSTRACT

A leveling pad for cameras and the like, usually triangular in shape. The pad, per se, includes a downwardly extending foot on each of its corners, at least one foot being vertically adjustable for leveling purposes. The pad is provided with an attachment screw for connecting the pad to an object to be supported, the screw being positioned in a slot for adjusting the center of gravity position of the supported structure.

5 Claims, 4 Drawing Figures

PATENTED DEC 5 1972  3,704,848
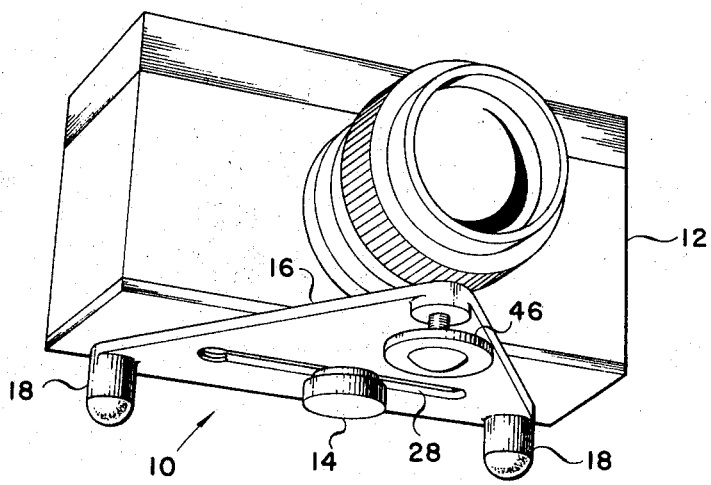
FIG. 1
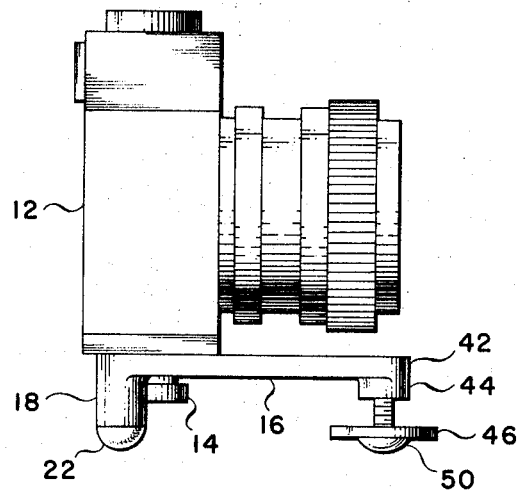
FIG. 2
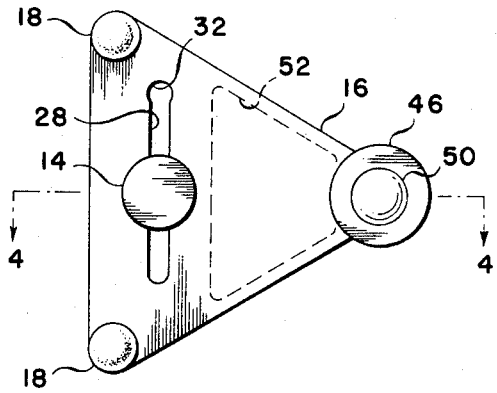
FIG. 3
FIG. 4
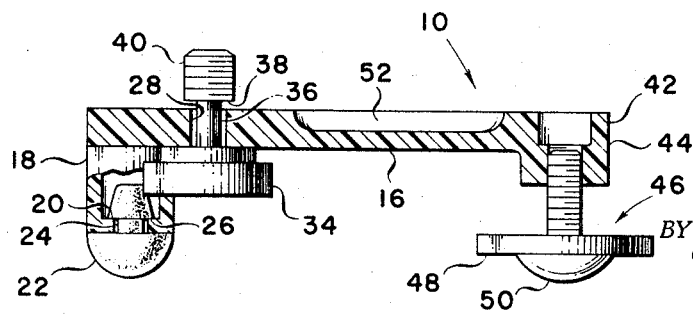
ERIC W. TREBES
FRED W. TREBES
  *INVENTORS.*
BY *Lowell D. Turner*
  Agent

MOUNTING AND LEVELING PAD

BACKGROUND OF THE INVENTION

There has been a long-felt need for a mechanically simple, light weight, compact, adjustable support for positioning cameras and the like when it is inconvenient or impossible for the operator to personally hold the camera, or to support it upon a sophisticated tripod structure. This need has been felt most particularly by candid camera fans who have desired to take time-delayed photos, sometimes appearing in the photos themselves.

The leveling pad of this invention has been found to have particular utility in the latter situations. Therein it is desirable for the photographer to align his camera with his subject matter and to then arm the trigger with a time delay, permitting the photographer sufficient time to then move forward during the time-delay period into orientation with the camera lens and to himself become a part of the subject matter of the picture.

Utilization of the mounting pad of this invention not only permits the photographer to place his camera in a convenient position upon a wall, a post, or any other convenient structure capable of supporting the same, but it additionally permits him to make appropriate adjustments in orienting the lens of his camera to properly focus upon the subject matter to be photographed. Additionally, camera equipment and other items which are sometimes supported upon this mounting pad, are often unsymmetrical insofar as weight distribution is concerned. Therefore, a lateral adjustability feature of this mounting pad permits it to be attached to the equipment to be supported, or to be adjusted after initial attachment, in a manner facilitating center of gravity balance of the equipment so mounted.

This leveling pad is also particularly adaptable as a piece of convenient equipment which can be readily handled, carried and mounted with a minimum of difficulty. It has been found to be significant that this leveling pad can be of a size which permits it to be readily carried in the pocket of the user during periods of non-use without being so bulky or heavy as to interfere with the activities or the appearance of the person carrying it.

BRIEF STATEMENT OF THE INVENTION

I have invented a leveling pad which is readily attachable, for example, to the bottom of a candid camera. This pad, which is preferably triangular in shape, includes a mounting screw inserted through and adjustably positioned within a lateral slot through the base of the pad. Although not mandatory, the triangle is usually isosceles, its base being adapted for orientation longitudinally of the camera base. Hence, the apex of the triangle extends outward to the front or to the rear of the camera when the pad is so attached. Since the camera lens extends forward of the camera there is a weight imbalance in that direction. Therefore, the apex is normally oriented in that direction to compensate for that weight. An adjustable foot located in the apex portion and adapted for vertical adjustability, provides a means for leveling the vertical orientation of the camera lense.

BRIEF DESCRIPTION OF THE DRAWINGS

This invention may be clearly understood by following the detailed description and by reference to the drawings in which:

FIG. 1 is a perspective view of the leveling pad of this invention as typically mounted upon a candid camera;

FIG. 2 is a side view of the illustration of FIG. 1;

FIG. 3 is a plan view of the underside of the leveling pad of this invention;

FIG. 4 is a sectional view taken along line 4—4 of FIG. 2.

DETAILED DESCRIPTION OF THE INVENTION

Referring now to FIG. 1, the adjustable leveling pad of this invention is generally indicated by the numeral 10. In this illustration it is shown as being mounted to the bottom of a candid camera 12 by means of an attachment screw 14.

It will be understood that the illustrated shape of the mounting 10 and of its adaptation to a candid camera 1 is for illustrative purposes only and is not to be taken as being limited in its application thereto. Additionally, while the pad is illustrated here as a support for a camera it is equally adaptable and has equally important application to any equipment having a receptacle for attachment of the screw 14 and which requires a support means for stability purposes. In particular, it may be applied to photography flash equipment, or as a support for extended, heavy camera lenses, or to any other equipment which requires adjustably supported orientation.

The mounting pad 10, in its usual configuration, as shown throughout the drawings, is fabricated from plastic and is normally injection molded. A body portion 16 of the pad 10 is made in a relatively thin section, the only requirement being that it be of sufficient strength to resist breakage when supporting equipment and during any relatively rough handling procedures.

The body 16 is provided with bosses 18 upon two of its corners. Bosses 18 are usually molded integral with the body 16, as best illustrated in FIG. 4. Although it is not mandatory, these bosses 18 are usually hollow and incorporate a shoulder 20 therein. Each boss is thereby adapted to receive a resilient tip member 22, which includes a shank 24 adapted for receipt into the cavity of the boss 18. The shank 24 includes a shoulder 26 adapted to engage the shoulder 20 once the shank 24 is inserted therein, thereby preventing removal of the tip member 22 without an intentional force being applied.

Located between the bosses 18, which are sometimes referred to as feet, is a slot 28. The slot 28 extends laterally along the base of the triangular body 16, parallel to the edge of the pad. One end of the slot 28 is provided with an enlarged region 32 of slightly larger diameter than the maximum width of the slot 28.

The attachment screw 14 is provided with an enlarged head 34, preferably knurled for ease of adjustment, and a shank 36 of a diameter slightly less than the width of the slot 28 for ease of movement therein. A shoulder 38 is provided upon the shank 36. An extremity beyond the shoulder 38 is provided with screw threads 40 of a size adapted to mate with the threads in the receptacle in the equipment to be mounted. The shoulder 38 and the thread portion 40 of the attachment screw 14 are of a diameter somewhat larger than the width of the slot 28. The enlarged region 32 at one end of the slot 28 is of a diameter slightly smaller than that of the screw threads 40 and the shoulder 38. The relatively soft consistency of the pad (usually being made of plastic) permits 40 to threads to be screwed therethrough, permitting the shoulder and threads to be inserted therethrough for purposes of installation and removal of the screw. Nevertheless, this interference fit prevents inadvertent loss of the screw, while permitting its free lateral movement along the length of the slot.

The apex 42 of the mounting pad 10 is provided with an integral boss 44, threaded to receive a vertically adjustable foot member or adjusting screw 46. This screw 46 includes an enlarged head, 48, the radius of which is greater than the radius of the apex 42. Thus, the enlarged head 48 extends outward beyond the periphery of the apex 42, providing the operator with the ability to place his fingers upon the periphery of the head and turn the screw so as to adjust its vertical position with respect to the rest of the mounting pad 10. It is this ability to easily adjust the vertical orientation of the mounting pad which provides this invention with ease of adjustment for leveling purposes.

The enlarged head 48 of the adjusting screw 46 is knurled for ease of handling during adjustment procedures.

A bulbous or protruding portion 50 usually extends downward from the enlarged head 48 to provide a member whereby point contact can be made with the surface upon which the pad rests. This facilitates utilization of the mounting pad of this invention upon surfaces which are relatively rough; this without the probability of an edge of the adjusting screw leading to difficulties in adjustment by engaging the rough texture of the supporting surface.

It has been found desirable to sometimes supply adjusting screws of the nature of the adjusting screw 46 in each of the bosses upon the three corners of the body 16, thereby providing a maximum of adjustability in both the vertical and the lateral directions. Alternatively, it is sometimes found that such adjusting screws in the apex and only one of the lateral bosses is required for satisfactory vertical and lateral adjustment purposes.

In application, when the mounting pad 10 is to be adapted to a piece of equipment such as the candid camera 12, the attachment screw 14 is engaged in the screw receptacle and tightened snugly. The pad with the camera movably attached is then placed on a surface upon which it is to be utilized and the operator determines the center of gravity position of the camera. He then moves the camera laterally along the slot 28, carrying with it the attachment screw, until the center of gravity is properly positioned and the camera is in lateral balance. The attachment screw 14 is then tightened to an extent sufficient to adequately retain its position relative to the camera. The operator next looks through his view finder and positions his camera such that his subject matter is properly aligned. He then turns the adjusting screw 46, moving it up or down until the bulbous portion 50 contacts the supporting surface firmly, thereby stabilizing the camera in its ultimate position. The operator may then proceed in his photographic procedures.

A recess 52 is provided in the upper surface of the pad body 16 to eliminate structural interferences with some equipment mounted upon the pad. When desirable or as required the recess 52 may be cut completely through the body 16, thereby providing a cut out.

Upon completion of such photographic procedures the operator may then easily remove the mounting pad 10 simply by removing the attachment screw and quickly and readily store the mounting pad in an appropriate location.

From the foregoing it will be seen that I have invented a new and novel mounting and leveling pad for camera equipment and the like. Characteristic of my invention is the use of a plurality of separated foot members, at least one of which is adjustable for achieving proper orientation of the mounted equipment. Additionally provided is a means for laterally orienting the equipment relative to the mounting pad such that center of gravity control can be readily achieved.

The above-described embodiments of this invention are illustrative of the principles involved and are not intended to define the only embodiments possible in accordance with this teaching. Rather, protection under the United States Patent Law shall be afforded to me not only to the specific embodiment shown but to those falling within the spirit and terms of the invention as defined by the following claims.

I claim:

1. An adjustable mounting pad for supporting photographic equipment and the like comprising a body member having a substantially flat shape;
    a plurality of feet separated from one another and extending in a common direction from one side of said body member;
    an adjusting screw engaged in at least one of said feet for adjusting the orientation of said body member and any structure mounted thereupon;
    slot means in said body member between two of said feet and including a discretely located enlarged region; and
    an attachment screw having a shank and a threaded portion of larger diameter than said shank adapted for insertion through said enlarged region, said shank extending through said slot means;
    said shank of said attachment screw being adapted for movement along said slot, whereby the center of gravity of the equipment supported upon said mounting pad may be adjusted.

2. The invention according to claim 1 wherein said body member is substantially triangular in shape.

3. The invention according to claim 1 wherein said feet comprise boss members constructed integral with said pad member, said adjusting screw being positioned in one such boss, and a pair of tip members positioned in the others thereof.

4. The invention according to claim 3 wherein said adjusting screw includes an enlarged head,
    the periphery of which extends beyond the periphery of said body member.

5. The invention according to claim 4 wherein the head of said adjusting screw includes a bulbous portion opposite a shank portion to provide a point contact region for contacting a support structure.

* * * * *